United States Patent
Shieh

(10) Patent No.: US 7,203,772 B2
(45) Date of Patent: Apr. 10, 2007

(54) BLUETOOTH DEVICE WITH USER-RECONFIGURABLE DEVICE NAME

(75) Inventor: Cheng-Hua Shieh, Taichung (TW)

(73) Assignee: Universal Scientific Industrial Co., Ltd. (TW)

( * ) Notice: Subject to any disclaimer, the term of this patent is extended or adjusted under 35 U.S.C. 154(b) by 419 days.

(21) Appl. No.: 10/910,852

(22) Filed: Aug. 4, 2004

(65) Prior Publication Data

US 2006/0031597 A1    Feb. 9, 2006

(51) Int. Cl.
*G06F 13/00* (2006.01)
*H04B 7/00* (2006.01)

(52) U.S. Cl. .................. 710/8; 710/62; 710/104; 709/220; 709/228; 455/41.2

(58) Field of Classification Search ............. 710/8–11, 710/62, 104; 709/220–228; 455/41.2, 426, 455/57, 566, 1; 370/254–255, 338
See application file for complete search history.

(56) References Cited

U.S. PATENT DOCUMENTS

| | | | |
|---|---|---|---|
| 6,687,517 B2 * | 2/2004 | Kinnunen | 455/569.1 |
| 7,050,945 B2 * | 5/2006 | Oba et al. | 702/188 |
| 7,089,298 B2 * | 8/2006 | Nyman et al. | 709/220 |
| 2002/0173347 A1 * | 11/2002 | Kinnunen | 455/569 |
| 2003/0013473 A1 * | 1/2003 | Adachi et al. | 455/517 |
| 2004/0198459 A1 * | 10/2004 | Oba et al. | 455/566 |
| 2004/0258032 A1 * | 12/2004 | Kawamura | 370/338 |
| 2004/0259499 A1 * | 12/2004 | Oba et al. | 455/41.2 |
| 2005/0172228 A1 * | 8/2005 | Kakuda | 715/530 |
| 2005/0172321 A1 * | 8/2005 | Kakuda | 725/81 |
| 2005/0266798 A1 * | 12/2005 | Moloney et al. | 455/41.2 |

* cited by examiner

*Primary Examiner*—Christopher Shin
(74) *Attorney, Agent, or Firm*—Eugene L. Flanagan, III; Cowan, Liebowitz & Latman, P.C.

(57) ABSTRACT

A Bluetooth device includes a processing unit and a memory unit. The memory unit has a default device name stored therein, and stores program instructions for configuring the processing unit to perform a method for reconfiguring the default device name of the Bluetooth device. The method includes, in response to a change name command received by the Bluetooth device from a host terminal, storing a user-defined device name received from the host terminal in the memory unit such that the user-defined device name serves as the default device name during subsequent transactions between the Bluetooth device and the host terminal.

1 Claim, 2 Drawing Sheets

BLUETOOTH DEVICE WITH USER-RECONFIGURABLE DEVICE NAME

BACKGROUND OF THE INVENTION

1. Field of the Invention

The present invention relates to a Bluetooth device, more particularly to a Bluetooth device with a user-reconfigurable device name.

2. Description of the Related Art

A conventional Bluetooth device, such as a printer, a personal digital assistant, a facsimile machine, a keyboard, a mouse, a joystick, etc., includes program instructions for sending a default device name thereof to a host terminal upon establishing a wireless communications link therewith for reference by the user through the host terminal during subsequent transactions between the Bluetooth device and the host terminal. For instance, a Bluetooth printer with model name 'A' includes program instructions for sending the default device name 'Model A Printer' to a host terminal upon establishing a wireless communications link therewith for reference by the user during subsequent transactions between the Bluetooth printer and the host terminal. In particular, the host terminal shows the default device name 'Model A Printer' together with state information of the Bluetooth printer on a display device of the host terminal, thereby enabling the user to monitor and control operation of the Bluetooth printer through the host terminal.

However, since the default device names of Bluetooth devices having the same model name 'A' are identical, when several of these Bluetooth devices are used concurrently, all of these Bluetooth devices report the same default device name to the host terminal such that the host terminal shows the different state information for the different Bluetooth devices using the same default device name on the display device thereof. Hence, the user is unable to monitor and control operations of the different Bluetooth devices due to confusion that arises from the use of the same default device name.

Furthermore, even when only one Bluetooth device is in use, the user may wish to customize the default device name of the Bluetooth device for personal preference.

SUMMARY OF THE INVENTION

Therefore, the object of the present invention is to provide a Bluetooth device with a user-reconfigurable device name so as to overcome the aforesaid drawbacks commonly encountered in the prior art.

Accordingly, a Bluetooth device of the present invention comprises a processing unit and a memory unit. The memory unit has a default device name stored therein, and stores program instructions for configuring the processing unit to perform a method for reconfiguring the default device name of the Bluetooth device. The method includes, in response to a change name command received by the Bluetooth device from a host terminal, storing a user-defined device name received from the host terminal in the memory unit such that the user-defined device name serves as the default device name during subsequent transactions between the Bluetooth device and the host terminal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
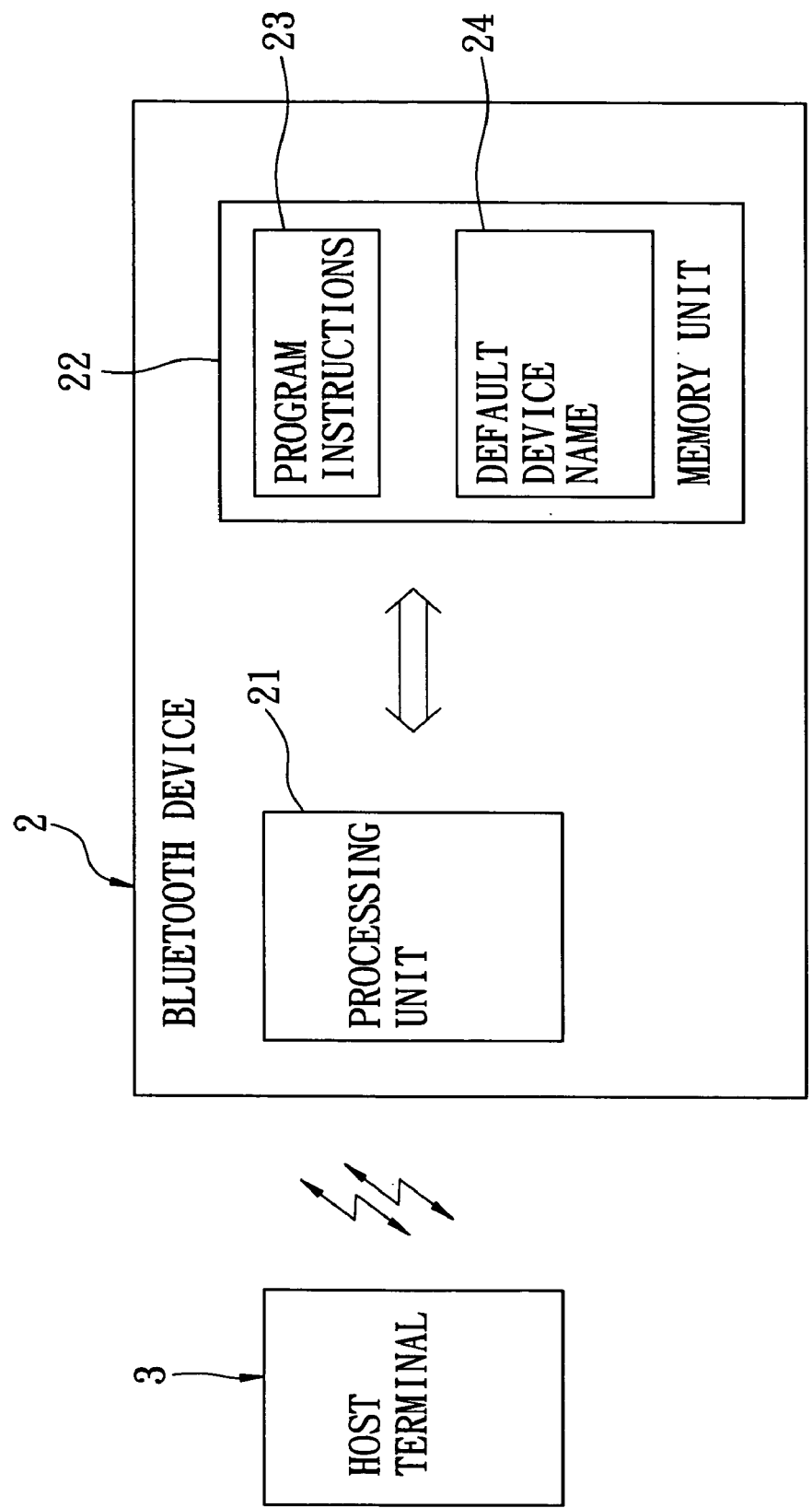
FIG. 1 is a schematic block diagram of the preferred embodiment of a Bluetooth device according to the present invention.

Referring to FIG. 1, the preferred embodiment of a Bluetooth device 2 according to the present invention is shown to include a processing unit 21 and a memory unit 22. The memory unit 22, such as a non-volatile flash memory, has a default device name 24 stored therein, and further stores program instructions 23 for configuring the processing unit 21 to perform a method for reconfiguring the default device name 24 of the Bluetooth device 2. The method includes, in response to a change name command received by the Bluetooth device 2 from a host terminal 3, storing a user-defined device name received from the host terminal 3 in the memory unit 22 such that the user-defined device name serves as the default device name 24 during subsequent transactions between the Bluetooth device 2 and the host terminal 3.

Figure 2:
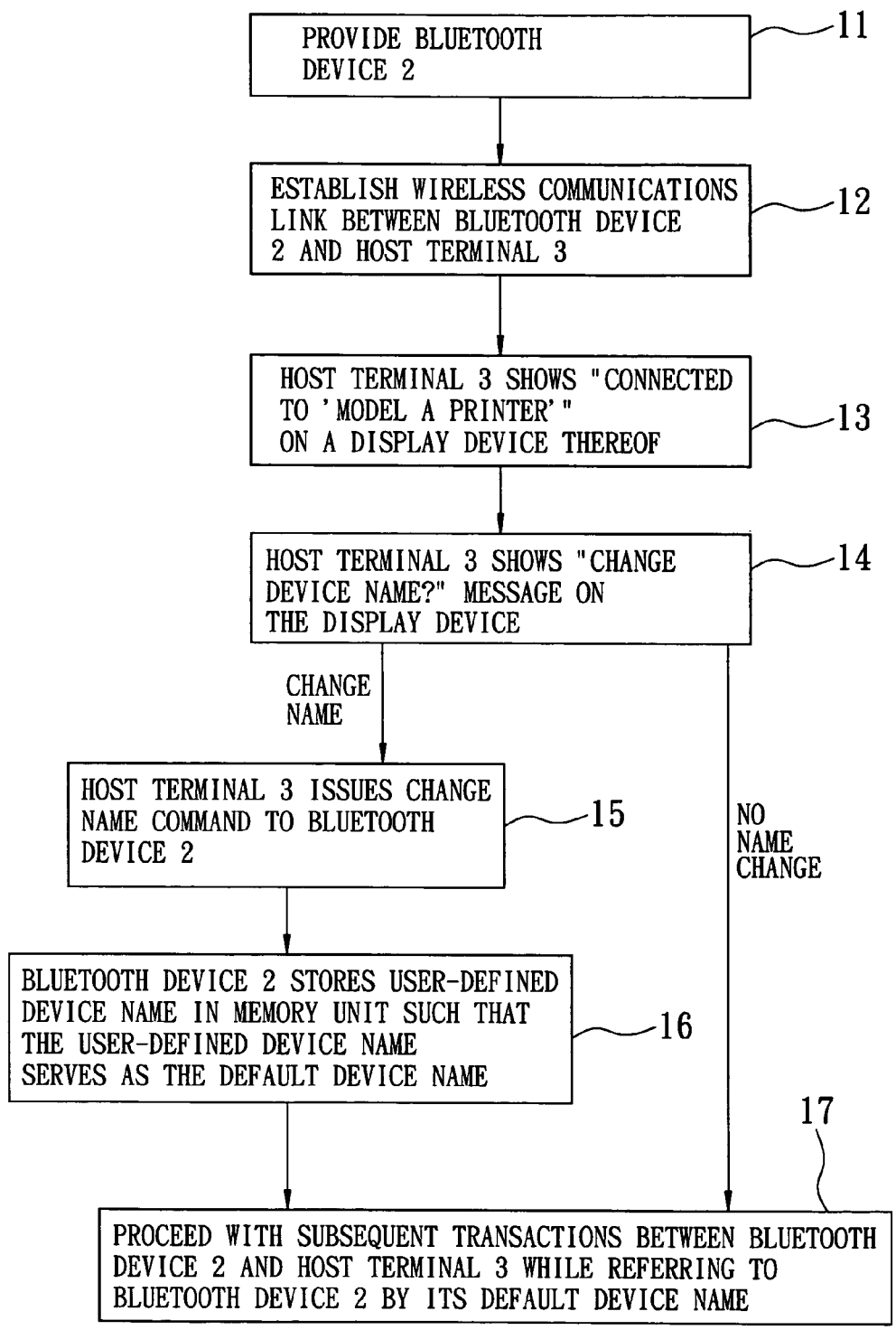
FIG. 2 is a flowchart to illustrate how the Bluetooth device of the preferred embodiment conducts transactions with a host terminal.

FIG. 2 illustrates how the Bluetooth device 2 of the preferred embodiment conducts transactions with the host terminal 3.

In step 11, there is provided the Bluetooth device 2 (for example, a Bluetooth printer with model name 'A') having a memory unit 22 with program instructions 23 and a default device name 24 (such as 'Model A Printer') stored therein.

In step 12, a wireless communications link is established between the Bluetooth device 2 and the host terminal 3 in a known manner such that the default device name 24 (i.e., 'Model A Printer') is transmitted from the Bluetooth device 2 to the host terminal 3.

In step 13, upon receiving the default device name 24 from the Bluetooth device 2, the host terminal 3 shows a message, such as "connected to 'Model A Printer'", on a display device thereof for reference by the user.

In step 14, the host terminal 3 shows another message, such as a "change device name" message, on the display device. If the user does not wish to change the default device name 24 of the Bluetooth device 2, the flow goes directly to step 17. Otherwise, the flow goes to step 15.

In step 15, the user enters a user-defined device name (for example, 'Taylor') for the Bluetooth device 2 via the host terminal 3, and the host terminal 3 issues a change name command to the Bluetooth device 2.

In step 16, in response to the change name command from the host terminal 3, the Bluetooth device 2 stores the user-defined device name (i.e., 'Taylor') in the memory unit 22 such that the user-defined device name (i.e., 'Taylor') now serves as the default device name 24 of the Bluetooth device 2.

In step 17, the default device name 24 is sent from the Bluetooth device 2 to the host terminal 3 for reference by the user through the host terminal 3 during subsequent transactions between the Bluetooth device 2 and the host terminal 3. In particular, if the default device name 24 of the Bluetooth device 2 was changed from 'Model A Printer' to 'Taylor' in the a forementioned manner, the host terminal 3 will show messages, such as "connected to 'Taylor'", on its display device for reference by the user during subsequent transactions with the Bluetooth device 2.

It should be noted that it is possible to change the default device name 24 in the memory unit 22 more than once by conducting the above steps to meet user requirements.

Accordingly, since the user can define different default device names for the Bluetooth devices 2 of this invention, when several of the Bluetooth devices 2 are used concurrently, the user is able to monitor and control operations of the different Bluetooth devices 2 without any confusion. Furthermore, the user is able to customize the default device names of the Bluetooth devices 2 based on personal preference.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A Bluetooth device comprising:

a processing unit; and a memory unit having a default device name stored therein, said memory unit further storing program instructions for configuring said processing unit to perform a method for reconfiguring said default device name of said Bluetooth device, said method including in response to a change name command received by said Bluetooth device from a host terminal, storing a user-defined device name received from the host terminal in said memory unit such that said user-defined device name serves as said default device name during subsequent transactions between said Bluetooth device and the host terminal.

* * * * *